United States Patent
Omiya et al.

(10) Patent No.: US 12,206,473 B2
(45) Date of Patent: Jan. 21, 2025

(54) WIRELESS COMMUNICATION METHOD, WIRELESS COMMUNICATION SYSTEM, AND WIRELESS COMMUNICATION PROGRAM

(71) Applicant: NIPPON TELEGRAPH AND TELEPHONE CORPORATION, Tokyo (JP)

(72) Inventors: Riku Omiya, Musashino (JP); Tomoaki Ogawa, Musashino (JP); Tomoki Murakami, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/274,238

(22) PCT Filed: Feb. 19, 2021

(86) PCT No.: PCT/JP2021/006388
§ 371 (c)(1),
(2) Date: Jul. 26, 2023

(87) PCT Pub. No.: WO2022/176163
PCT Pub. Date: Aug. 25, 2022

(65) Prior Publication Data
US 2024/0088955 A1    Mar. 14, 2024

(51) Int. Cl.
*H04B 7/02*    (2018.01)
*H04B 7/04*    (2017.01)
(Continued)

(52) U.S. Cl.
CPC ....... *H04B 7/0456* (2013.01); *H04B 7/04013* (2023.05); *H04B 17/3912* (2015.01)

(58) Field of Classification Search
CPC .............. H04B 7/0456; H04B 7/04013; H04B 17/3912; H04B 7/145; Y02D 30/70
(Continued)

(56) References Cited

U.S. PATENT DOCUMENTS

| | | | | |
|---|---|---|---|---|
| 2012/0206299 A1* | 8/2012 | Valdes-Garcia | ....... | H04B 7/145 343/915 |
| 2013/0038433 A1* | 2/2013 | Ullrich | .................. | G08G 1/164 340/425.5 |

(Continued)

OTHER PUBLICATIONS

Ohmiya et al., "Repeater Selection Method for Intelligent Radiospace Design", 2020 IEICE Society Conference, Sep. 1, 2020, 3 pages including English Translation.

*Primary Examiner* — Helene E Tayong
(74) *Attorney, Agent, or Firm* — XSENSUS LLP

(57) ABSTRACT

A wireless communication system includes a sensing unit that detects an obstacle currently present between a transmitting station and a receiving station. There is an environment memory that stores information on a detection result of the sensing unit, an environment prediction unit that predicts a variation in a radio wave propagation environment between the transmitting station and the receiving station from the information stored in the environment memory. There is further a simulation calculation unit that simulates an environment in which a communication path between the receiving station and a reflector and a communication path between the transmitting station and the reflector are a line-of-sight environment on the basis of a prediction result of the environment prediction unit and calculates a control parameter of the reflector that achieves the environment. Further, a reflector control unit controls the reflector in accordance with the control parameter calculated by the simulation calculation unit.

4 Claims, 4 Drawing Sheets

(51) Int. Cl.
*H04B 7/0456* (2017.01)
*H04B 17/391* (2015.01)
(58) Field of Classification Search
USPC .......................................................... 375/267
See application file for complete search history.

(56) References Cited

U.S. PATENT DOCUMENTS

2014/0114635 A1* 4/2014 Sato ..................... H04B 17/391
 703/13
2016/0360361 A1* 12/2016 Ross ..................... H04W 4/023
2020/0336919 A1* 10/2020 Han ...................... H04W 16/18

\* cited by examiner

WIRELESS COMMUNICATION METHOD, WIRELESS COMMUNICATION SYSTEM, AND WIRELESS COMMUNICATION PROGRAM

CROSS-REFERENCE TO RELATED APPLICATION

The present application is based on PCT filing PCT/JP2021/006388, filed Feb. 19, 2021, the entire contents of which are incorporated herein by reference.

TECHNICAL FIELD

The present invention relates to a wireless communication method, a wireless communication system, and a wireless communication program.

BACKGROUND ART

In order to handle mobile traffic that has increased in recent years, it is important to improve frequency utilization efficiency. Therefore, attempts have been made to improve signal strength and reduce interference by actively controlling the radio wave propagation environment itself. For example, Non Patent Literature 1 discloses a technology of varying a radio wave propagation environment by using a repeater such as a reflector in combination.

CITATION LIST

Non Patent Literature

Non Patent Literature 1: Riku Omiya and 5 other persons, "Interijentokukan keiseinotameno musenchukeiki kumiawase sentakuhou (Method for selecting combination of wireless relays for forming intelligent space)", Institute of Electronics, Information and Communication Engineers Society Convention, 2020

SUMMARY OF INVENTION

Technical Problem

In order to increase the effect of the reflector, it is necessary that both communication paths between the transmitting station and the reflector and between the reflector and the receiving station have a line-of-sight (LOS) environment in which there is no obstacle. In the conventional technology, it is difficult to appropriately control parameters such as an installation position and a reflection angle of a reflector according to a real environment in order to make each communication path a line-of-sight environment.

The present invention has been made in view of the above-described problems. An object of the present invention is to provide a wireless communication system, a wireless communication method, and a wireless communication program capable of securing a communication path in a line-of-sight environment.

Solution to Problem

A wireless communication system according to an aspect of the present invention is a wireless communication system in which radio waves transmitted from a transmitting station toward a receiving station are reflected by a reflector. This wireless communication system includes: a sensing unit that detects an obstacle currently present between a transmitting station and a receiving station; an environment information storage unit that stores information on a detection result of the sensing unit; an environment prediction unit that predicts a variation in a radio wave propagation environment between the transmitting station and the receiving station from the information stored in the environment information storage unit; a simulation calculation unit that simulates an environment in which a communication path between the receiving station and a reflector and a communication path between the transmitting station and the reflector are a line-of-sight environment on the basis of a prediction result of the environment prediction unit and calculates a control parameter of the reflector that achieves the environment; and a reflector control unit that controls the reflector in accordance with the control parameter calculated by the simulation calculation unit.

In addition, a wireless communication method according to an aspect of the present invention is a wireless communication method in which radio waves transmitted from a transmitting station toward a receiving station are reflected by a reflector. This wireless communication method includes: a sensing step of detecting an obstacle currently present between a transmitting station and a receiving station; an environment information storage step of storing information on a detection result of the sensing step; an environment prediction step of predicting a variation in a radio wave propagation environment between the transmitting station and the receiving station from the information stored in the environment information storage step; a simulation calculation step of simulating an environment in which a communication path between the receiving station and a reflector and a communication path between the transmitting station and the reflector are a line-of-sight environment on the basis of a prediction result of the environment prediction step and calculating a control parameter of the reflector that achieves the environment; and a reflector control step of controlling the reflector in accordance with the control parameter calculated by the simulation calculation step.

Advantageous Effects of Invention

According to the present invention, it is possible to secure a communication path in a line-of-sight environment.

DESCRIPTION OF EMBODIMENTS

Hereinafter, an embodiment will be described with reference to the accompanying drawings. In the present disclosure, redundant description will be simplified or omitted as appropriate. Note that the present disclosure is not limited to the embodiments described below. The present disclosure may include various modifications and combinations of configurations disclosed by the following embodiment without departing from the spirit of the present disclosure.

Embodiment 1

Figure 1:
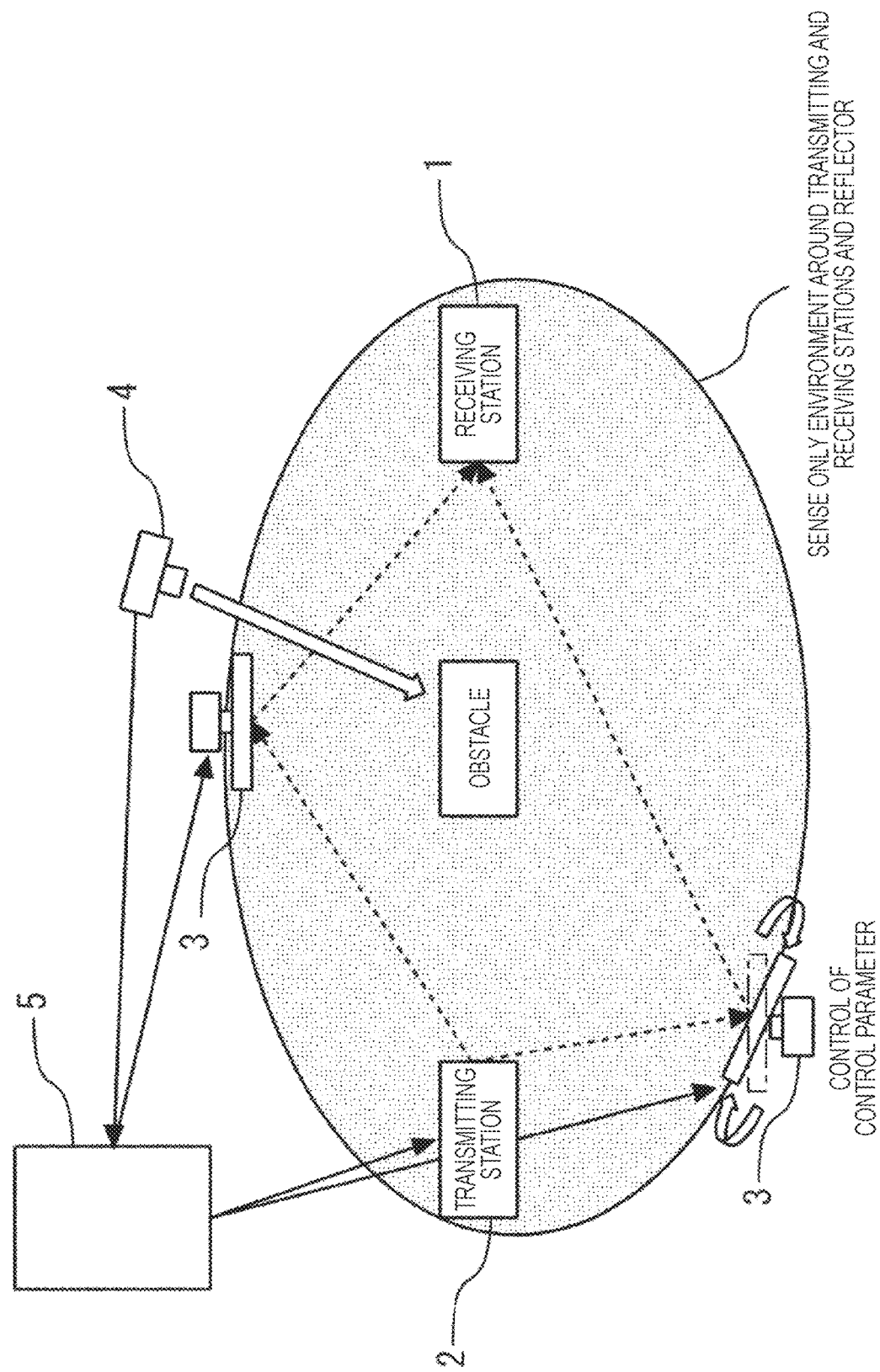
FIG. 1 is a diagram schematically illustrating a configuration example of a wireless communication system according to Embodiment 1.
Figure 2:
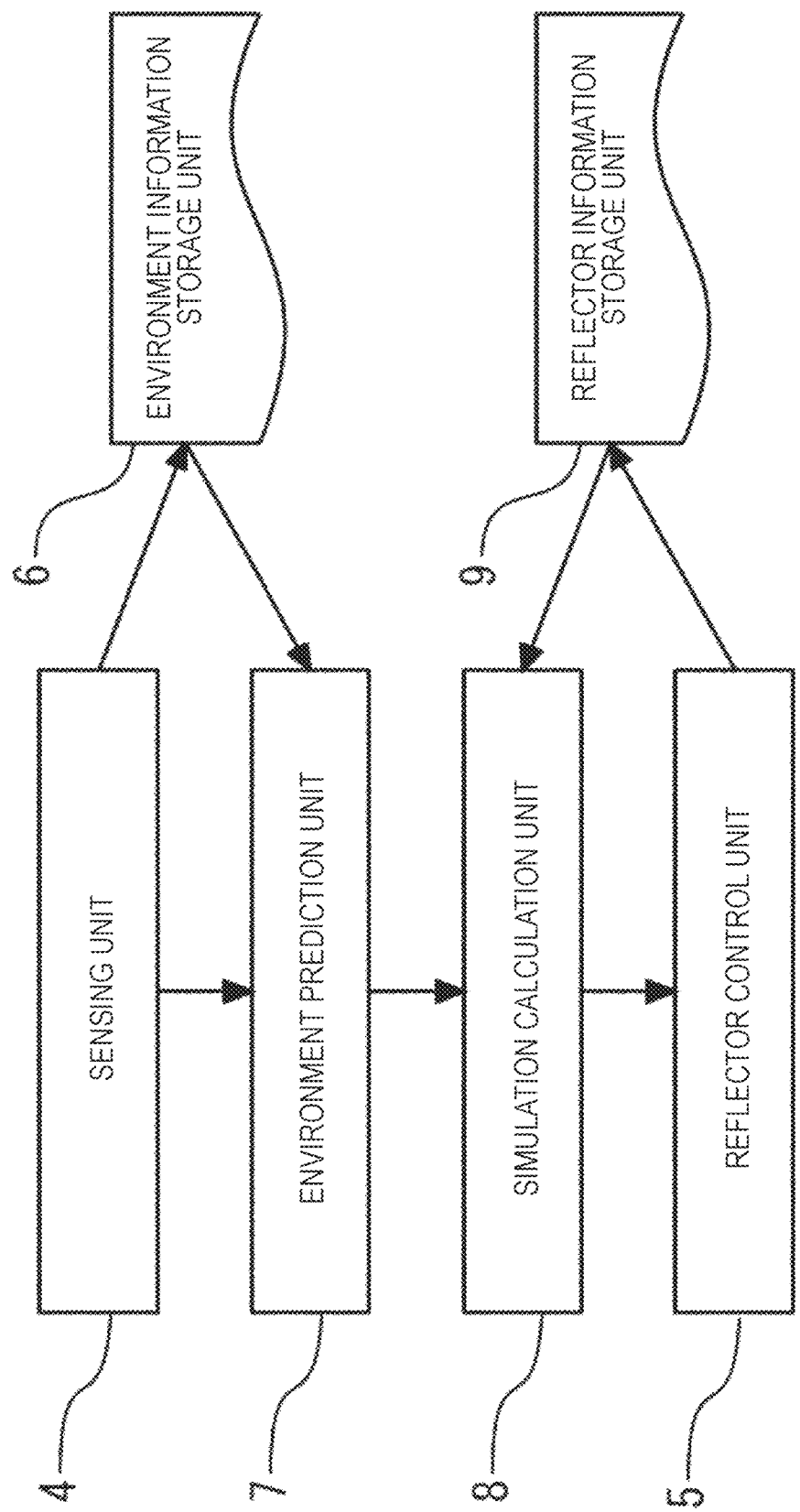
FIG. 2 is a functional block diagram illustrating main functions of the wireless communication system according to Embodiment 1.

FIG. 1 is a diagram schematically illustrating a configuration example of a wireless communication system according to Embodiment 1. FIG. 2 is a functional block diagram illustrating main functions of the wireless communication system according to Embodiment 1.

The wireless communication system according to the present embodiment is a system that achieves a good radio wave propagation environment by reflecting radio waves transmitted by a transmitting station 2 toward a receiving station 1 by a reflector 3. The wireless communication system can be implemented as a single device or can be implemented by cooperation of a plurality of devices.

The reflector 3 has a function of reflecting and relaying radio waves transmitted by the transmitting station 2. As an example, the wireless communication system includes a plurality of reflectors 3.

The reflector 3 is capable of controlling parameters such as an installation position and a reflection angle. By controlling each parameter of the reflector 3, for example, a good radio wave propagation environment can be secured following environmental changes such as movement of an obstacle.

The wireless communication system according to the present embodiment includes a sensing unit 4 and a reflector control unit 5. The sensing unit 4 is a sensing device for recognizing the environment of the real world. The reflector control unit 5 controls the reflector 3 on the basis of information detected by the sensing unit 4.

The sensing unit 4 detects an obstacle currently present between the transmitting station 2 and the receiving station 1. Note that "obstacle" in the present disclosure refers to an object that shields radio waves transmitted by the transmitting station 2.

The sensing unit 4 corresponds to, for example, a 3D laser scanner that acquires point cloud data, a camera that captures a real image, or the like. Note that the types of devices forming the sensing unit 4 and the types of data acquired by the sensing unit 4 are not limited. The sensing unit 4 can be formed in any manner as long as it can acquire data for detecting the position of an obstacle.

As an example, the sensing unit 4 senses only the environment around the receiving station 1, the transmitting station 2, and the reflector 3. As a result, it is possible to achieve simplification and acceleration of recognition of the environment of the real world.

The wireless communication system according to the present embodiment includes an environment information storage unit 6 as a database that stores information on the detection result of the sensing unit 4. The environment information storage unit 6 stores information on past detection results by the sensing unit 4. Information stored in the environment information storage unit 6 is updated each time the sensing unit 4 performs sensing.

In addition, the wireless communication system according to the present embodiment includes an environment prediction unit 7 and a simulation calculation unit 8.

The environment prediction unit 7 predicts a variation in the radio wave propagation environment between the transmitting station 2 and the receiving station 1 from information stored in the environment information storage unit 6.

The simulation calculation unit 8 simulates an environment in which a communication path between the receiving station 1 and the reflector 3 and a communication path between the transmitting station 2 and the reflector 3 are a line-of-sight environment on the basis of the prediction result of the environment prediction unit 7. Then, the simulation calculation unit 8 calculates control parameters of the reflector 3 for achieving the environment obtained by the simulation.

As described above, the reflector control unit 5 controls the parameters of the reflector 3. Specifically, the reflector control unit 5 controls the reflector 3 with the control parameters calculated by the simulation calculation unit 8.

Information on each parameter of the reflector 3 controlled by the reflector control unit 5 is stored in a reflector information storage unit 9 as a database. The reflector information storage unit 9 stores current and past information on the reflector 3. The information accumulated in the reflector information storage unit 9 is used for simulation and calculation of control parameters by the simulation calculation unit 8.

Figure 3:
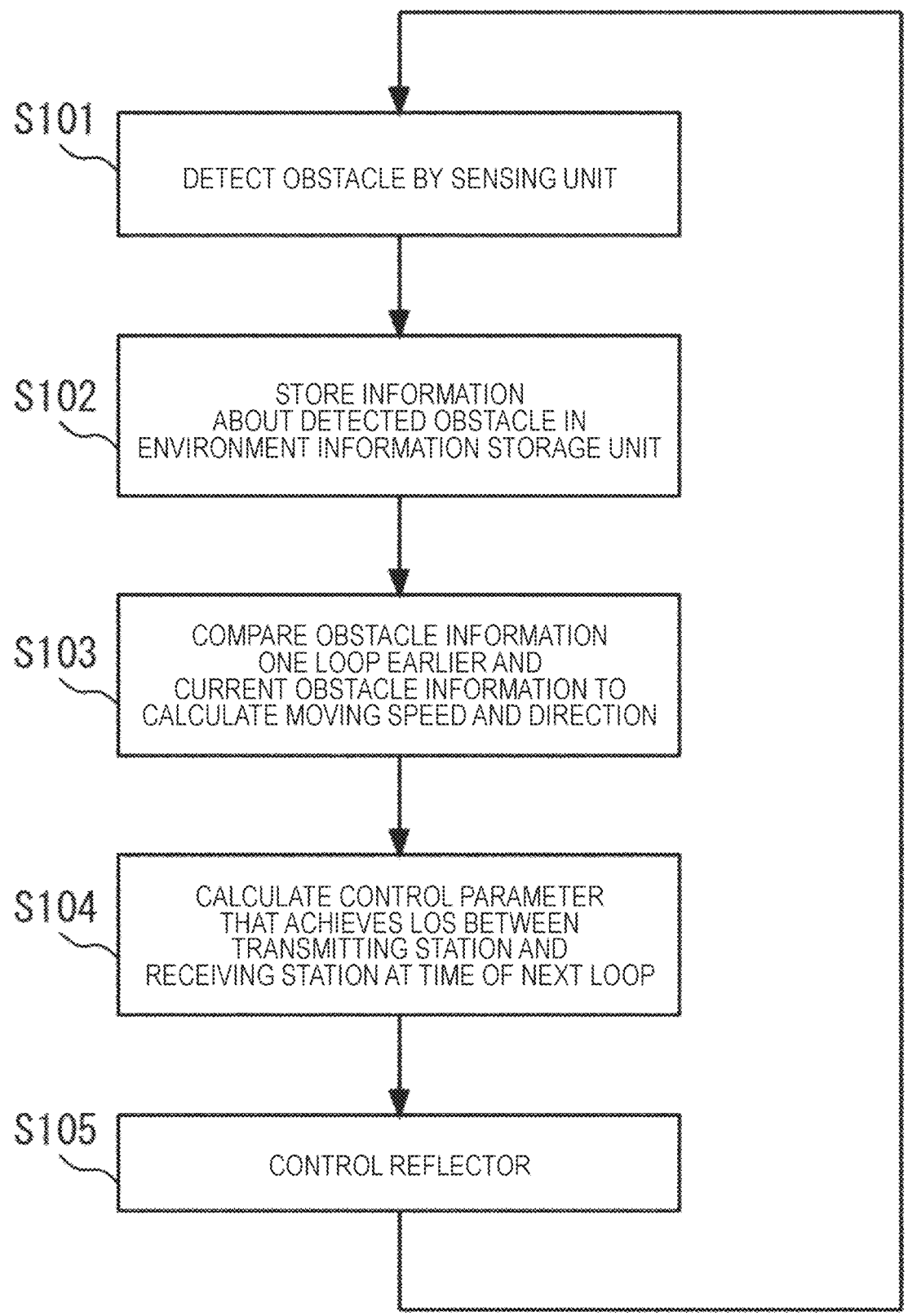
FIG. 3 is a flowchart illustrating an operation example of the wireless communication system according to Embodiment 1.

FIG. 3 is a flowchart illustrating an operation example of the wireless communication system according to Embodiment 1. The wireless communication system according to the present embodiment repeatedly loops the flow illustrated in FIG. 3 to grasp the environment of the real world, predict the future environment, and control the reflector 3 according to the future environment.

First, the sensing unit 4 acquires data to detect an obstacle (S101). Then, information about the detected obstacle is stored in the environment information storage unit 6 (S102).

Next, the environment prediction unit 7 predicts a variation in the radio wave propagation environment. Specifically, past obstacle information one loop earlier is compared with the current obstacle information, and the moving speed, the moving direction, and the like of the obstacle are calculated (S103). The environment prediction unit 7 predicts an environmental change such as movement of an obstacle from the current time to the next loop on the basis of the calculation result.

Next, simulation and calculation of control parameters are performed by the simulation calculation unit 8. The simulation calculation unit 8 simulates an environment in which a communication path between the receiving station 1 and the reflector 3 and a communication path between the transmitting station 2 and the reflector 3 are a line-of-sight environment at the time of the next loop on the basis of the prediction result of the environment prediction unit 7. Then, the simulation calculation unit 8 calculates control parameters of the reflector 3 for achieving the environment obtained by the simulation (S104). The reflector control unit 5 controls the reflector 3 in accordance with the control parameters (S105).

According to the wireless communication system configured as described above, it is possible to secure a communication path in a line-of-sight environment. According to the present embodiment, it is possible to control the radio wave propagation path to improve signal strength and reduce interference at a desired specific position. Note that each function of the wireless communication system can also be implemented as a wireless communication method.

In addition, some or all of the functions of the wireless communication system according to the above embodiment and modification may be implemented using hardware such as an application specific integrated circuit (ASIC), a programmable logic device (PLD), or a field programmable gate array (FPGA). Each function of the wireless communication system may be implemented by a combination of dedicated hardware and software. In addition, some or all of the functions of the wireless communication system may be formed as a program executed by a processor such as a CPU. The program may be recorded in a computer-readable storage medium.

For example, the wireless communication system can be implemented by using a computer and a program, and the program can be recorded in a storage medium or provided through a network.

Figure 4:
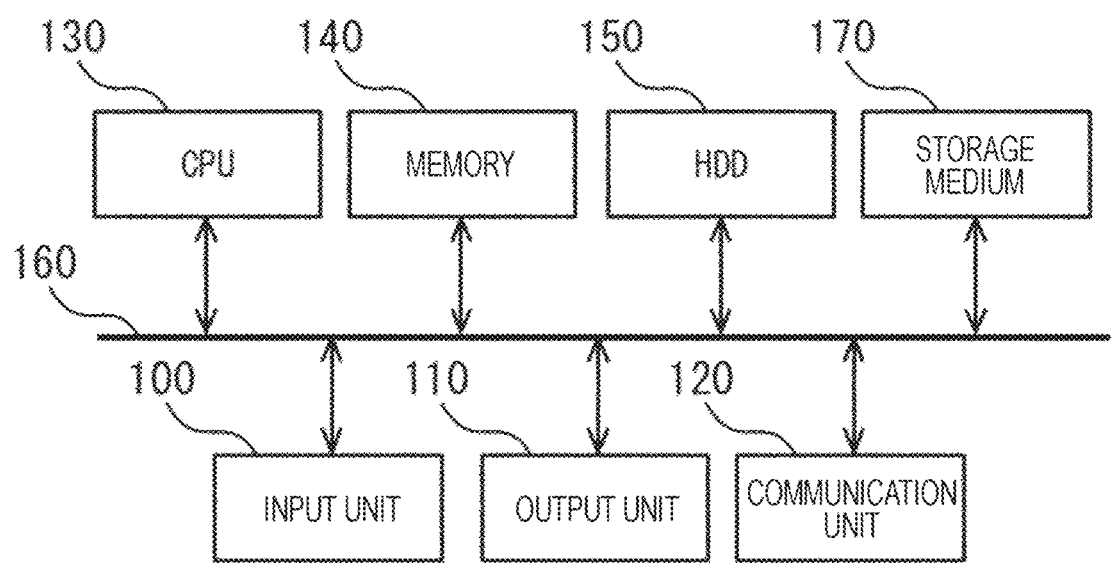
FIG. 4 is a diagram illustrating a hardware configuration example for implementing each function of the wireless communication system.

FIG. 4 is a diagram illustrating a hardware configuration example for implementing each function of the wireless communication system. As illustrated in FIG. 4, each function of the wireless communication system is implemented by, for example, an input unit 100, an output unit 110, a communication unit 120, a CPU 130, a memory 140, an HDD 150, and the like. The input unit 100, the output unit 110, the communication unit 120, the CPU 130, the memory 140, and the HDD 150 are connected via a bus 160 and have a function as a computer. In addition, a computer including the input unit 100, the output unit 110, the communication unit 120, the CPU 130, the memory 140, the HDD 150, and the like can input and output data to and from a computer-readable storage medium 170.

The input unit 100 is, for example, a keyboard, a mouse, or the like. The output unit 110 is, for example, a display device such as a display. The communication unit 120 is, for example, a wireless network interface.

The CPU 130 controls each unit forming the wireless communication system, and performs predetermined processing and the like. The memory 140 and the HDD 150 function as a storage unit that stores various data and the like.

The storage medium 170 stores a program for executing each function of the wireless communication system. Note that the architecture forming the wireless communication system is not limited to the example illustrated in FIG. 3.

The "computer" mentioned herein includes an OS and hardware such as peripheral devices. "Computer-readable storage medium" is, for example, a portable medium such as a flexible disk, a magneto-optical disk, a ROM, or a CD-ROM.

Furthermore, "computer-readable storage medium" may be a medium that dynamically holds a program for a short period of time like a communication line in a case where the program is transmitted via a network such as the Internet or a communication line such as a telephone line. In addition, "computer-readable storage medium" may be a medium that holds a program for a certain period of time, such as a volatile memory inside a computer serving as a server or a client.

INDUSTRIAL APPLICABILITY

The wireless communication system, the wireless communication method, and the wireless communication program according to the present invention can be applied to, for example, a mobile base station that provides wireless communication.

REFERENCE SIGNS LIST

1 Receiving station
2 Transmitting station
3 Reflector
4 Sensing unit
5 Reflector control unit
6 Environment information storage unit
7 Environment prediction unit
8 Simulation calculation unit
9 Reflector information storage unit
100 Input unit
110 Output unit
120 Communication unit
130 CPU
140 Memory
150 HDD
160 Bus
170 Storage medium

The invention claimed is:

1. A wireless communication system that reflects radio waves, the wireless communication system comprising:
  a sensor that detects an obstacle currently present between a transmitting station and a receiving station;
  an environment information memory that stores information on a detection result of the sensor;
  environment prediction circuitry that predicts a variation in a radio wave propagation environment between the transmitting station and the receiving station from the information stored in the environment information memory;
  simulation calculation circuitry configured to simulate an environment in which a communication path between the receiving station and a reflector and a communication path between the transmitting station and the reflector are a line-of-sight environment on the basis of a prediction result of the environment prediction circuitry and calculates a control parameter of the reflector that achieves the environment; and
  reflector control circuitry that controls the reflector in accordance with the control parameter calculated by the simulation calculation circuitry.

2. A wireless communication method for reflecting radio waves, the method comprising:
  detecting an obstacle currently present between a transmitting station and a receiving station;
  storing information on a detection result of the detecting;
  predicting a variation in a radio wave propagation environment between the transmitting station and the receiving station from the information stored in the storing;
  simulating an environment in which a communication path between the receiving station and a reflector and a communication path between the transmitting station and the reflector are a line-of-sight environment on the basis of a prediction result of the predicting and calculating a control parameter of the reflector that achieves the environment; and
  controlling the reflector in accordance with the control parameter calculated by the simulation calculation step.

3. A non-transitory computer readable medium storing a wireless communication program for causing a computer to function as the wireless communication system according to claim 1.

4. A non-transitory computer readable medium storing a wireless communication program for causing a computer to perform the method of claim 2.

* * * * *